US008794698B2

(12) United States Patent
Halsey

(10) Patent No.: US 8,794,698 B2
(45) Date of Patent: Aug. 5, 2014

(54) COLLAPSIBLE VIDEO GAMING CHAIR

(76) Inventor: Bryan K. Halsey, Phoenix, AZ (US)

(*) Notice: Subject to any disclaimer, the term of this patent is extended or adjusted under 35 U.S.C. 154(b) by 495 days.

(21) Appl. No.: 13/088,747

(22) Filed: Apr. 18, 2011

(65) Prior Publication Data

US 2011/0254327 A1  Oct. 20, 2011

Related U.S. Application Data

(60) Provisional application No. 61/325,484, filed on Apr. 19, 2010.

(51) Int. Cl.
*A47B 83/02* (2006.01)
*A47C 4/28* (2006.01)
*A47C 7/72* (2006.01)
*A47C 15/00* (2006.01)
*A47C 7/50* (2006.01)
*A47C 7/68* (2006.01)

(52) U.S. Cl.
CPC . *A47C 4/286* (2013.01); *A47C 7/72* (2013.01); *A47C 15/004* (2013.01); *A47C 7/50* (2013.01); *A47C 7/68* (2013.01)
USPC ......... 297/153; 297/30; 297/16.2; 297/217.3; 463/36

(58) Field of Classification Search
USPC ............. 297/148, 153, 154, 155, 174 R, 173, 297/158.4, 158.5, 159.1, 30, 16.2, 217.3; 463/36, 37, 38, 39
See application file for complete search history.

(56) References Cited

U.S. PATENT DOCUMENTS

| | | | | |
|---|---|---|---|---|
| 830,487 | A * | 9/1906 | Backe | 297/79 |
| 4,591,206 | A * | 5/1986 | Pribble | 297/148 |
| 4,606,576 | A * | 8/1986 | Jones | 297/153 |
| 5,896,125 | A * | 4/1999 | Niedzwiecki | 345/168 |
| 5,911,634 | A * | 6/1999 | Nidata et al. | 472/59 |
| 6,044,772 | A * | 4/2000 | Gaudette et al. | 108/43 |
| 6,083,106 | A * | 7/2000 | McDowell | 463/46 |
| 6,264,271 | B1 * | 7/2001 | Munn et al. | 297/45 |
| 6,450,570 | B1 * | 9/2002 | Hoekstra et al. | 297/153 |
| 6,505,885 | B1 * | 1/2003 | Tang | 297/16.2 |
| 6,722,681 | B1 * | 4/2004 | Large | 280/304.1 |
| 6,773,060 | B2 * | 8/2004 | Sher et al. | 297/188.14 |
| 6,843,527 | B2 * | 1/2005 | Nelson et al. | 297/18 |
| 6,899,386 | B2 * | 5/2005 | Anton | 297/174 R |
| 7,210,735 | B2 * | 5/2007 | Lang | 297/155 |
| 7,297,060 | B2 * | 11/2007 | Brase et al. | 463/36 |
| 7,322,653 | B2 * | 1/2008 | Dragusin | 297/300.3 |
| 7,500,689 | B2 * | 3/2009 | Pasternak et al. | 280/304.1 |

(Continued)

*Primary Examiner* — David E Allred
(74) *Attorney, Agent, or Firm* — Donald R. Boys; Central Coast Patent Agency, Inc.

(57) ABSTRACT

A foldable, deployable chair for video game controller presentation has a folding frame supporting a chair seat, a back support, and left and right armrests, a substantially planar hand controller support surface extending from the forward end of one of the left and right armrests to the forward end of the other left and right armrest, the controller support surface pivoted to a frame extension at one end, and resting on a frame extension at the other end, surface is substantially horizontal and may be raised and rotated about the pivot at the frame extension at the one end, allowing a user to be seated and then lowered about the pivot, presenting the controller support surface the seated user in a position within comfortable reach of a user's hands, and a fastening interface on the hand controller support surface adapted to fasten the hand-operable controller devices to the support surface.

7 Claims, 5 Drawing Sheets

(56) References Cited

U.S. PATENT DOCUMENTS

| | | |
|---|---|---|
| 7,662,042 B2 * 2/2010 | Oswald | 463/46 |
| 7,753,787 B2 * 7/2010 | Arche et al. | 463/37 |
| 8,197,341 B2 * 6/2012 | Gray | 463/36 |
| 8,251,452 B2 * 8/2012 | Hill | 297/380 |
| 2005/0009611 A1 * 1/2005 | Masaya et al. | 463/46 |
| 2005/0159219 A1 * 7/2005 | Oswald | 463/36 |
| 2005/0255925 A1 * 11/2005 | Brase et al. | 463/47 |
| 2005/0266922 A1 * 12/2005 | Lee | 463/37 |
| 2006/0111181 A1 * 5/2006 | Thorsen | 463/36 |
| 2007/0035164 A1 * 2/2007 | North | 297/217.1 |
| 2007/0262628 A1 * 11/2007 | Perigny | 297/284.4 |
| 2007/0298883 A1 * 12/2007 | Feldman et al. | 463/36 |
| 2009/0206641 A1 * 8/2009 | Brown, Jr. | 297/217.3 |
| 2009/0218860 A1 * 9/2009 | Hernandez et al. | 297/217.3 |
| 2010/0144437 A1 * 6/2010 | Gray | 463/36 |
| 2010/0222146 A1 * 9/2010 | Evans et al. | 463/36 |
| 2011/0256930 A1 * 10/2011 | Jaouen | 463/37 |

* cited by examiner

COLLAPSIBLE VIDEO GAMING CHAIR

CROSS-REFERENCE TO RELATED APPLICATIONS

The present application claims priority to provisional application Ser. No. 61/325,484, filed on Apr. 19, 2010. The 61/325,484 application above is incorporated in its entirety herein by reference.

BACKGROUND OF THE INVENTION

1. Field of the Invention

The present invention is in the area of supports for game controllers, and pertains more specifically to a folding chair supporting one or more game control interfaces.

2. Description of Related Art

Video games and controllers for same are well-known in the art, and controllers are known in the art that are adapted to be foldable or portable, for example, to be held in a user's lap, to be hand-held, or to be supported on a table, for example. There is a need for a more comfortable, configurable and flexible support for controllers and also for the persons that may be using the controllers.

BRIEF SUMMARY OF THE INVENTION

Having considered the problems of providing support surfaces for hand and foot controller devices to a user for use in playing video games, the inventor has developed a unique solution. A foldable, deployable chair for video game controller presentation is provided, comprising a folding frame supporting a chair seat, a back support, and left and right armrests, each armrest having a rearward end proximate the chair back and a forward end in the unfolded, deployed mode, a substantially planar hand controller support surface extending from the forward end of one of the left and right armrests to the forward end of the other left and right armrest, the controller support surface pivoted to a frame extension at one end, and resting on a frame extension at the other end, such that the surface is substantially horizontal and may be raised and rotated about the pivot at the frame extension at the one end, allowing a user to be seated in the chair, and then lowered about the pivot, presenting the controller support surface to a seated user in a position within comfortable reach of a user's hands, and a fastening interface on the hand controller support surface adapted to fasten one or more hand-operable controller devices to the support surface.

In one embodiment the foldable, deployable chair has a hand controller support surface mounted to the framework in a manner that the substantially planar support surface may be rotated from horizontal about an axis extending from the frame extensions at the forward ends of each armrest. The chair seat, back support and armrests may be made of fabric material.

In one embodiment the foldable, deployable chair further comprises frame elements extending forward and down, supporting a substantially planar foot controller support surface at a position within comfortable reach of a user's feet, at an angled orientation substantially facing the chair, and a fastening interface on the foot controller support surface adapted to fasten one or more foot-operable controller devices to the support surface. There may be adjustable strap elements extending from the foot controller support surface to the frame, enabling a user to adjust the position and distance of the foot control support surface to accommodate user's leg length and position preference.

In another embodiment the foldable, deployable chair may also include one or more hand controller devices fastened to the hand controller support surface, and in another embodiment may include one or more foot controller devices fastened to the foot controller support surface as well.

DETAILED DESCRIPTION OF THE INVENTION

The inventor provides a portable and collapsible gaming chair that incorporates one or more game controller devices adapted to work with one or more video game systems. The present invention is described in enabling detail using the following examples which may represent more than one embodiment of the present invention.

Figure 1:
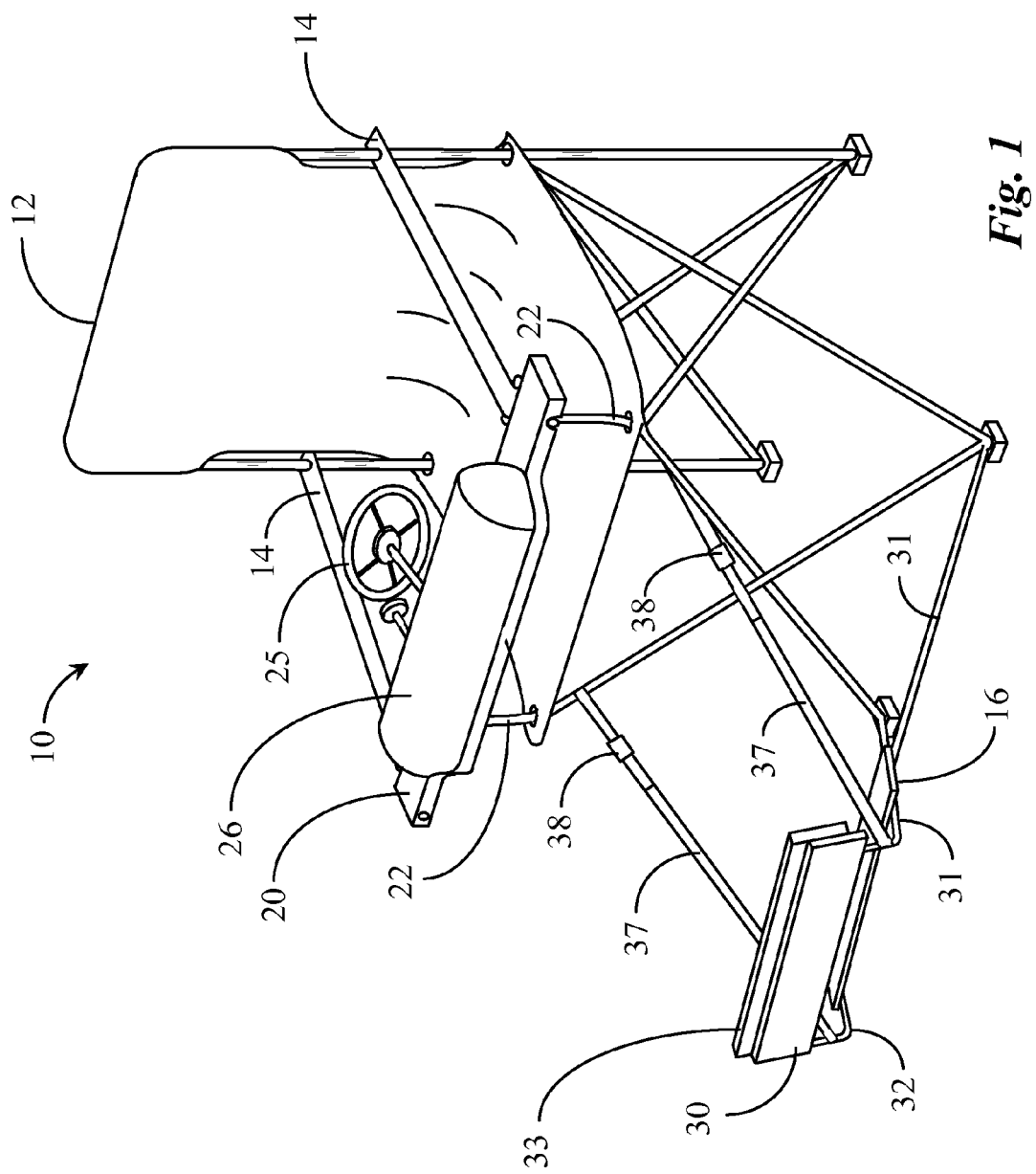
FIG. 1 is a perspective view of a portable game controller folding chair according to an embodiment of the present invention.

Referring now to FIG. 1 of the accompanying drawings, a portable game controller folding chair 10 is illustrated in perspective view. Folding chair 10 is, in this embodiment, a collapsible chair comprising a rigid but collapsible frame that supports a fabric seat and back rest 12, fabric armrests 14 (right and left), and fabric footrest 16.

Chair 10 includes, in one embodiment, an adjustment system for adjusting footrest proximity relative to the chair body. The adjustment system includes frame members 31 connected to footrest 16 and adjustment straps 37 connected to the frame members 31. Adjustment straps 37 each include a strap adjustment mechanism 38 (one per strap) that are manually configurable by a user to adjust the proximity of footrest 16 closer or further away from the chair body in order to accommodate different users. In this embodiment chair 10 is a fabric folding chair that can be collapsed and stowed inside a fabric enclosure. The use of fabric, however, for portions of the folding chair is not a limitation in the invention. Other materials may be used as well.

A hand controller carrier base 20 is provided and is adapted to be attached to chair using supporting frame extensions 24. Frame extensions 24 may be attached to frame portions 22 of the collapsible chair frame that support armrests 14. Hand controller base 20 supports a modular hand controller interface 26 that may be mounted to the carrier using a variety of optional techniques including but not limited to riveting, snapping, nut and bolt, clamping, screws, hook and loop connector, plug-in, or other known methods.

Hand controller base 20 and hand controller interface 26 may be fabricated of a lightweight and durable plastic, metal or another durable material. Molding and other known fabrication techniques may be used in production of controller base 20 and controller interface 26. Hand controller interface 26 has one or more video game hand controllers 25 coupled thereto in operable fashion. In one embodiment hand controller interface 26 supports a variety of different hand controller devices that might be used to play a video game including but not limited to a steering wheel, a joy stick, an acceleration controller, a braking controller, shift lever, handle bars, functional buttons, functional switches, and like devices used in video game play or simulation systems. In one embodiment hand controller base 20 and attached interface 26 are adjustable as a unit to enable ergonomic tilt according to user height while seated within the folding chair.

A foot controller carrier base 30 is provided and is adapted to be attached to chair 10 using supporting frame extensions 32. Frame extensions 32 may be attached to frame portions 31 of the collapsible chair frame that support footrest 16. Foot controller base 30 supports a modular foot controller interface 33 that may be mounted to the carrier using a variety of optional techniques including but not limited to riveting, snapping, nut and bolt, clamping, screws, hook and loop connector, plug-in, or other known methods.

Foot controller base 30 and foot controller interface 33 may be fabricated of a lightweight and durable plastic, metal or another durable material. Molding and other known fabrication techniques may be used in production of controller base 30 and controller interface 33.

In one embodiment foot controller interface 33 supports a variety of different foot-operated controller devices that might be used in conjunction with hand controllers to play a video game including but not limited to a gas pedal, an acceleration controller, a braking controller, functional buttons, functional switches, and like foot-operated devices used in video game play. It is noted herein that in one embodiment foot controller base 30 and foot controller interface 33 are not absolutely required in order to practice the present invention. Foot controller devices, if any are required, may be modularly added to hand controller interface 26 without departing from the spirit and scope of the present invention.

Figure 2:
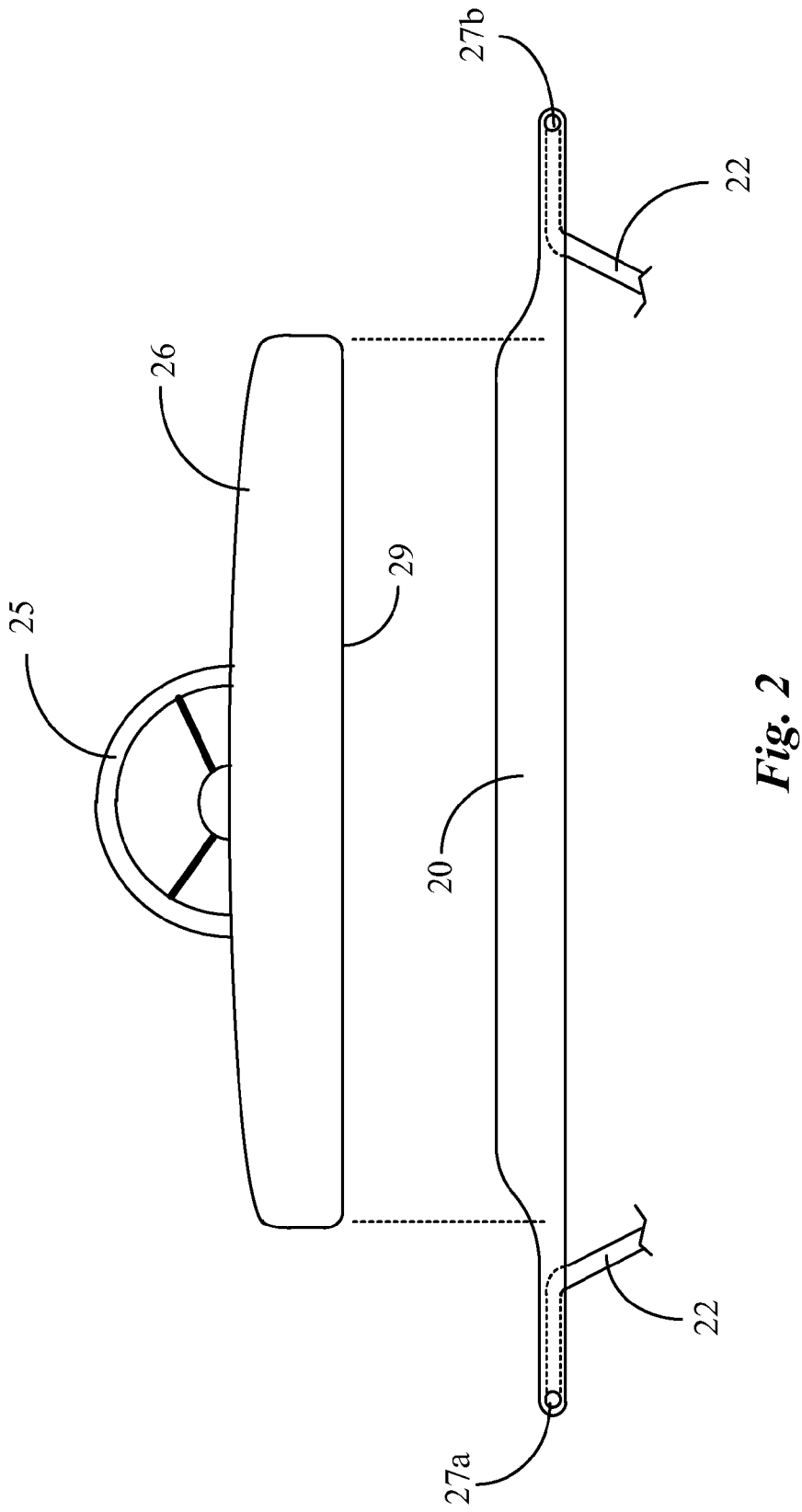
FIG. 2 is an elevation view of a hand controller interface and a hand controller base of the chair of FIG. 1 with the hand controller interface presented in a position of elevation above the hand controller base.

Referring now to FIG. 2, hand controller interface 26 and hand controller base 20 are illustrated in elevation view with interface 26 presented in a position of elevation above base 20. Hand controller interface 26 includes all of the electronic circuitry, ports, and wiring connections required to enable interface 26 to host one or more video game controllers. In some embodiments wireless components and infrared components may also be included in the electronics of the interface. Contact surface 29 may include any type of connective feature described previously for attaching the interface to the base component.

In one embodiment hand controller base 20 is pivotally mounted to frame extensions 24. Also in one embodiment hand controller base 20 is attached to frame extensions 24 via a sleeve 27a and a resting surface channel or indentation 27b. In such an embodiment a user may pivot the assembled unit (base 20, interface 26) up and out of the way to accommodate exiting and reentering the chair.

Figure 3:
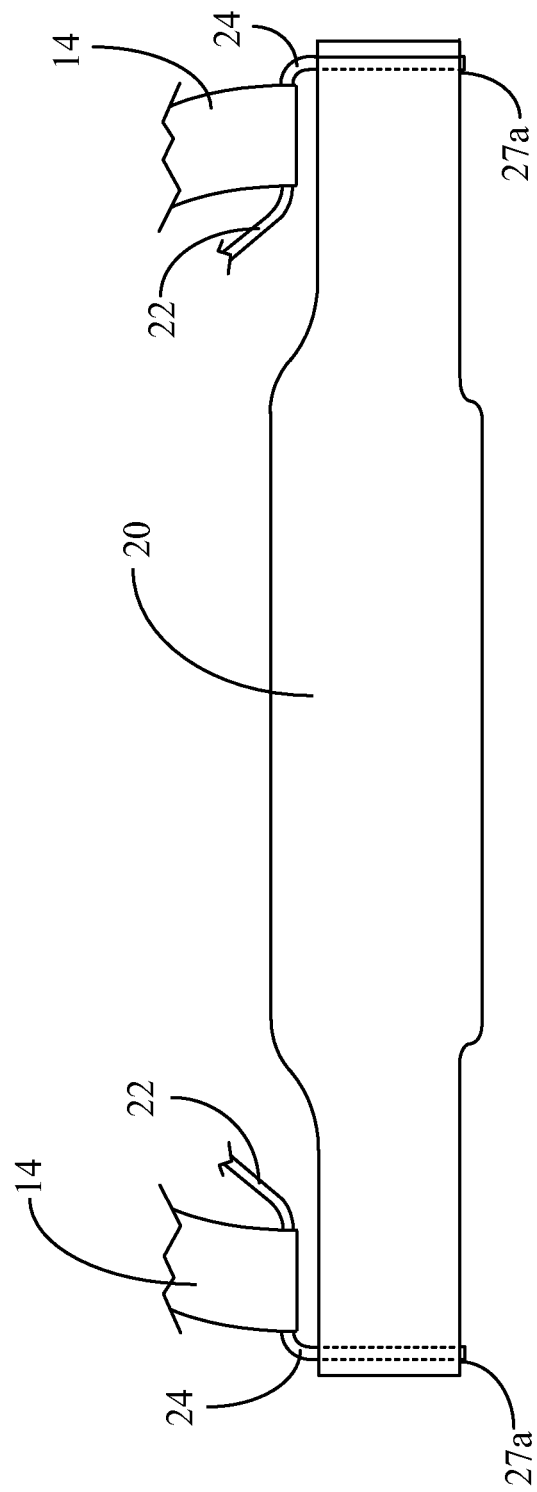
FIG. 3 is an overhead view of the hand controller base further illustrating connection to chair frame elements according to an embodiment of the present invention.

Referring now to FIG. 3, hand controller base 20 is viewed from above further illustrating connection to chair frame elements. Base 20 includes contact surface 28, which may include any connective features previously described above for enabling attachment of the hand controller interface. In this example, hand controller base 20 is pivotally mounted at connection point 27a, which may be a sleeve. Base 20 rests over extension 24 on the opposite end. Extensions 24 may be attached to frame elements 22 using clasps, clamps, sleeves, ties, nuts and bolts, or other secure methods. Fabric armrests 14 are visible in this overhead view.

Figure 4:
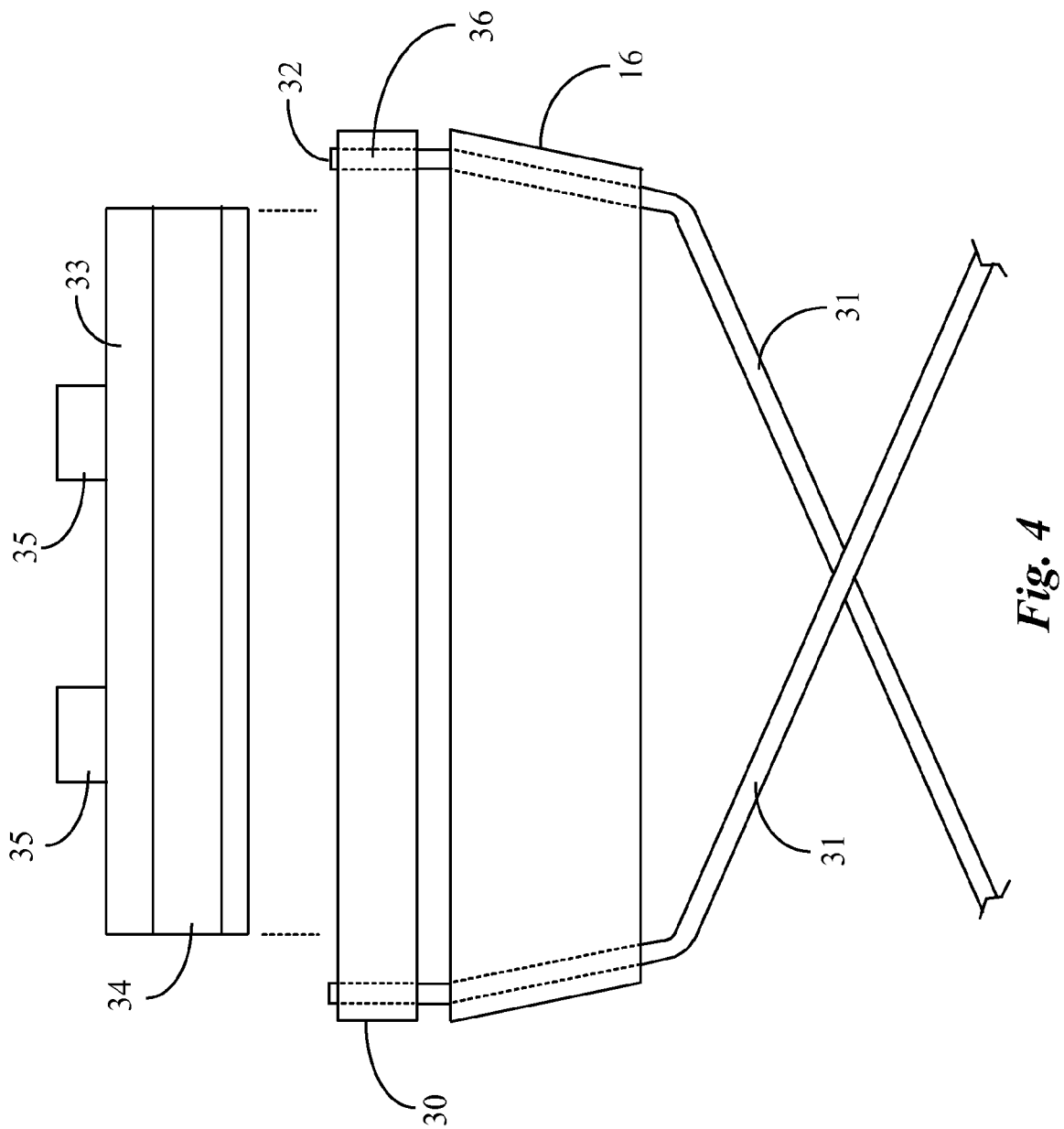
FIG. 4 is an elevation view of a foot controller base and modular foot controller interface of the chair of FIG. 1 with the foot controller interface presented in a position of elevation above base 30.

Referring now to FIG. 4, foot controller base 30 and modular foot controller interface 33 are illustrated in elevation view with interface 33 presented in a position of elevation above base 30. In this embodiment foot controller interface 33 includes one or more foot-operated controller devices 35, which are in the form of one or more pedals, and may be referred to hereinafter as controller pedals 35. Contact surface 34 may include any connective features previously described above for enabling attachment of the foot controller interface 33 to foot controller base 30.

Foot control carrier 30 attaches to frame extensions 32, which in turn may be attached to frame portions 31 of the collapsible chair frame that supports footrest 16. Foot control base 30 includes a contact surface 34, which may include any of the connective features described above for attaching foot controller interface 33 to foot controller base 30. In one embodiment foot controller base 30 may be attached to frame extensions 32 as described above for hand controller base 20 by using a sleeve 36 at one end of the base element whereby foot controller base 30 has a channeled surface that may rest upon the opposing frame extension 32.

Figure 5:
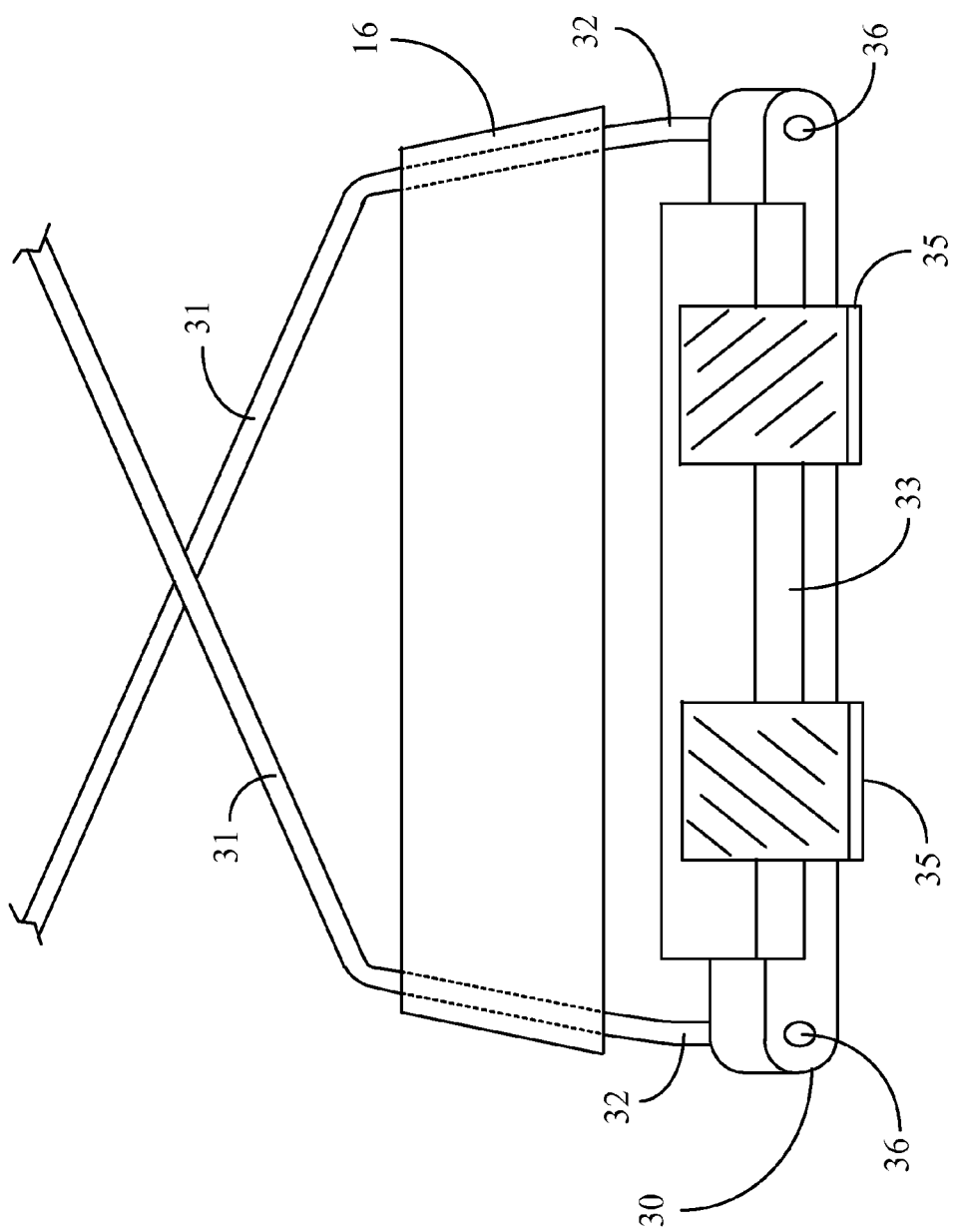
FIG. 5 is an overhead view of the foot controller base and attached foot controller interface of the chair of FIG. 1 mounted to frame extensions 32 according to an embodiment of the present invention.

Referring now to FIG. 5, foot controller base 30 and attached foot controller interface 33 are illustrated in overhead view mounted to frame extensions 32 via bores or sleeves 36. In this example pedals 35 are fully in view. Foot controller base 30 and foot controller interface 33 include all of the electronic circuitry, ports, and wiring connections required to enable interface 33 to host one or more video game controllers, in this case foot pedals 35.

Set-up of the collapsible video gaming chair of the present invention entails removing it and any detached components from a case or tote bag and then opening the folded chair into the gaming position. The hand controller interface and base may then be connected together if not already connected. The base and controller may then be assembled to the chair frame. The foot controller interface and base may then be connected together if not already connected. The foot base and controller may then be assembled to the chair. A user may then pivot the hand controller assembly up and out of the way about the connecting sleeve or other pivotal attachment to sit in the chair and then may return the assembly to its level position for play. The footrest adjustment straps can be physically adjusted if need be to bring the foot controller assembly into comfortable reach for operation. Alternatively, in one embodiment the system comes with a generic wiring harness for use with the hand and foot control interfaces that require wiring between them and or to a video game system.

In one embodiment the footrest portion is excluded in its entirety to adapt to gaming platforms that do not require controls that would normally be controlled with the user's feet or those that may be incorporated into the hand controller interface. One with skill in the art of device integration will appreciate that the video game controller chair of the present invention may be created or assembled using a controller kit that includes the hand and foot controller carriers and interface units and all of the accompanying attachment hardware, wiring, and stock controller devices without departing from the spirit and scope of the present invention.

In another embodiment the video gaming chair of the present invention may be manufactured with the controller hardware and components wholly or partly assembled whereby a user finishes the assembly by attaching the controller interfaces and the desired controller devices before game play. The video game controller interfaces may support wired and wireless communications capability and may be set up to be compatible with any type of video game systems that require the use of hand and or foot operated controller devices, including, but not limited to Wii gaming systems, PlayStation™ gaming systems, and X-Box 360™ gaming systems.

In a preferred embodiment the video game folding chair of the present invention may be efficiently disassembled, collapsed, and stowed when not in use. When the system is collapsed, the components thereof including the hand and foot controller interfaces and carrier bases may be inserted into a case or tote bag for storage or travel.

The hand controller interface and the foot controller interface along with their corresponding carriers may also be collapsible or may otherwise be geometrically reduced in footprint to allow for efficient transport in the same or a separate case or tote bag.

It will be apparent to one with skill in the art that the collapsible video gaming chair system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

The invention claimed is:

1. A foldable, deployable chair for video game controller presentation, comprising:
    a folding frame supporting a chair seat, a back support, and left and right armrests, each armrest having a rearward end proximate the back support and a forward end in an unfolded, deployed mode;
    a substantially planar support surface extending from the forward end of one of the left and right armrests to the forward end of the other of the left and right armrest, left and right frame extensions each being one-piece with the left and right armrest support members, the left and right frame extensions having an L-shaped configuration and extending outwardly from the armrest in the unfolded, deployed mode, the support surface pivoted to one of the frame extensions at one end, and resting on the other of the frame extensions at the other end, such that the surface is substantially horizontal and is configured to be raised and rotated about a pivot at the frame extension at the one end, allowing a user to be seated in the chair, and then after raising, the support surface is configured to be lowered about the pivot, presenting the support surface to a seated user in a position within comfortable reach of a user's hands, wherein the pivot is provided by a leg of the L-shaped configuration which defines a horizontal pivot axis in the unfolded, deployed mode;
    a modular hand controller interface attached to the support surface adapted to host one or more video game hand controller devices, and wherein the modular hand controller interface is enabled to communicate with video game players by wired connection or wirelessly.

2. The foldable, deployable chair of claim 1 wherein the support surface is mounted to the framework in a manner that the substantially planar support surface may be rotated from horizontal about an axis extending from the frame extensions at the forward ends of each armrest.

3. The foldable, deployable chair of claim 1 wherein one or more of the chair seat, back support and armrests are made of fabric material.

4. The foldable, deployable chair of claim 1 further comprising frame elements extending forward and up from the chair seat, supporting a substantially planar foot controller support surface at a position within comfortable reach of a user's feet, the foot controller support surface extending at an angled orientation relative to the frame elements substantially facing the chair in the unfolded deployed mode; and
    a fastening interface on the foot controller support surface adapted to fasten one or more foot-operable controller devices to the foot controller support surface.

5. The foldable, deployable chair of claim 4 further comprising adjustable strap elements extending from the foot controller support surface to the frame, enabling a user to adjust the position of the foot control support surface and distance between the foot control support surface and the chair seat to accommodate user's leg length and position preference.

6. The foldable, deployable chair of claim 1 further comprising a plurality of hand controller devices fastened to the support surface including at least one of a steering wheel, a joy stick, an acceleration controller, a braking controller, shift lever, handle bars, functional buttons and functional switches.

7. The foldable, deployable chair of claim 4 further comprising one or more foot controller devices fastened to the foot controller support surface.

* * * * *